Figure 1:
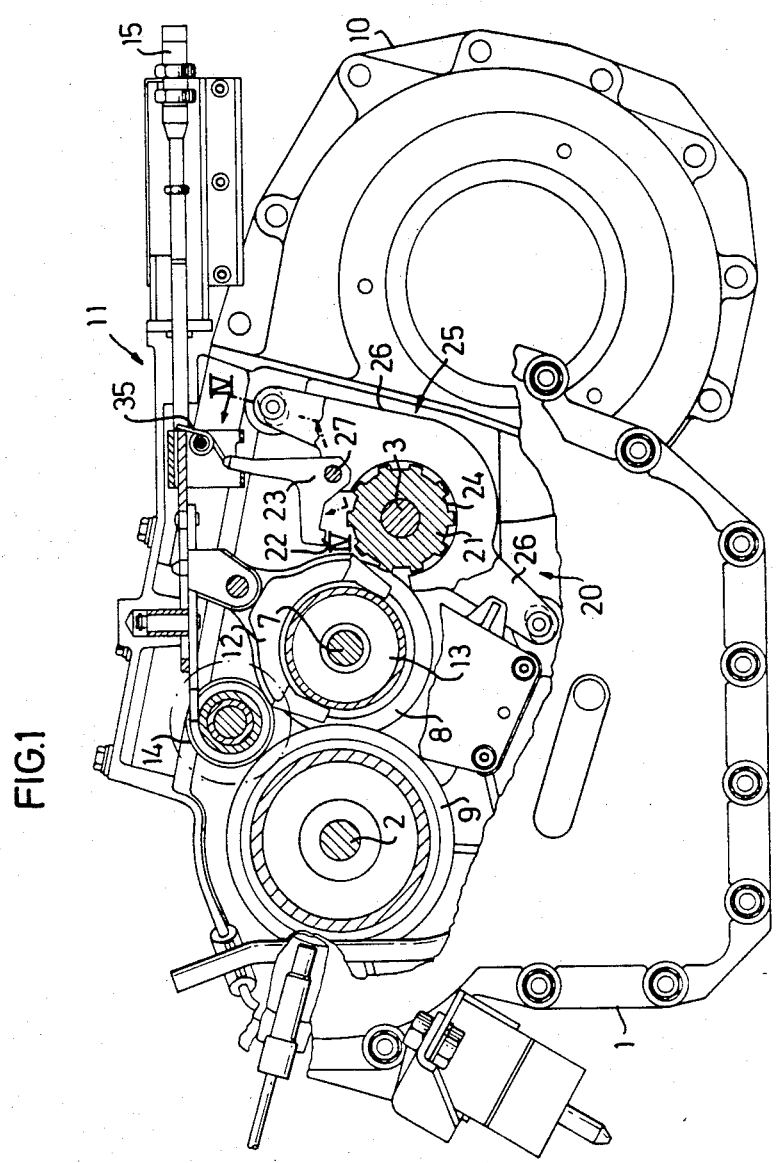

United States Patent [19]

Schlicker

[11] Patent Number: 4,519,483
[45] Date of Patent: May 28, 1985

[54] PARKING BRAKE IN A VEHICLE TRANSMISSION

[75] Inventor: Heinrich A. Schlicker, Bengtsfors, Sweden

[73] Assignee: AB Volvo, Gothenburg, Sweden

[21] Appl. No.: 442,795

[22] Filed: Nov. 18, 1982

[30] Foreign Application Priority Data

Nov. 24, 1981 [SE] Sweden .................... 8106982

[51] Int. Cl.³ ............................................... B60K 41/26
[52] U.S. Cl. .................................... 192/4 A; 74/411.5
[58] Field of Search ............ 192/4 A, 4 R; 74/577 S, 74/578, 411.5

[56] References Cited

U.S. PATENT DOCUMENTS

| | | | |
|---|---|---|---|
| 3,637,055 | 1/1972 | Young | 192/4 R |
| 3,952,838 | 4/1976 | Osten et al. | 192/4 A |
| 4,257,282 | 3/1981 | Wilczewski | 74/578 X |

Primary Examiner—George H. Krizmanich
Attorney, Agent, or Firm—Young & Thompson

[57] ABSTRACT

A parking brake in a transmission consists of a toothed wheel non-rotatably joined to the output shaft of the transmission and a pawl on an arm which is pivotally joined to the housing. The arm is pivotally mounted in a yoke which partially encircles the toothed wheel and is limitedly movably mounted in the housing on opposite sides of the output shaft. The yoke has abutment surfaces on diametrically opposite sides of the toothed wheel, and when the pawl engages the toothed wheel, the yoke will be displaced so that—depending on the direction in which the toothed wheel is loaded—one of the abutment surfaces comes into contact against the toothed wheel. This eliminates bending stresses on the shaft at the same time as the forces transmitted to the housing will be only a fraction of the force acting between the pawl and the toothed wheel, due to the difference in the length of the moment arms.

7 Claims, 6 Drawing Figures

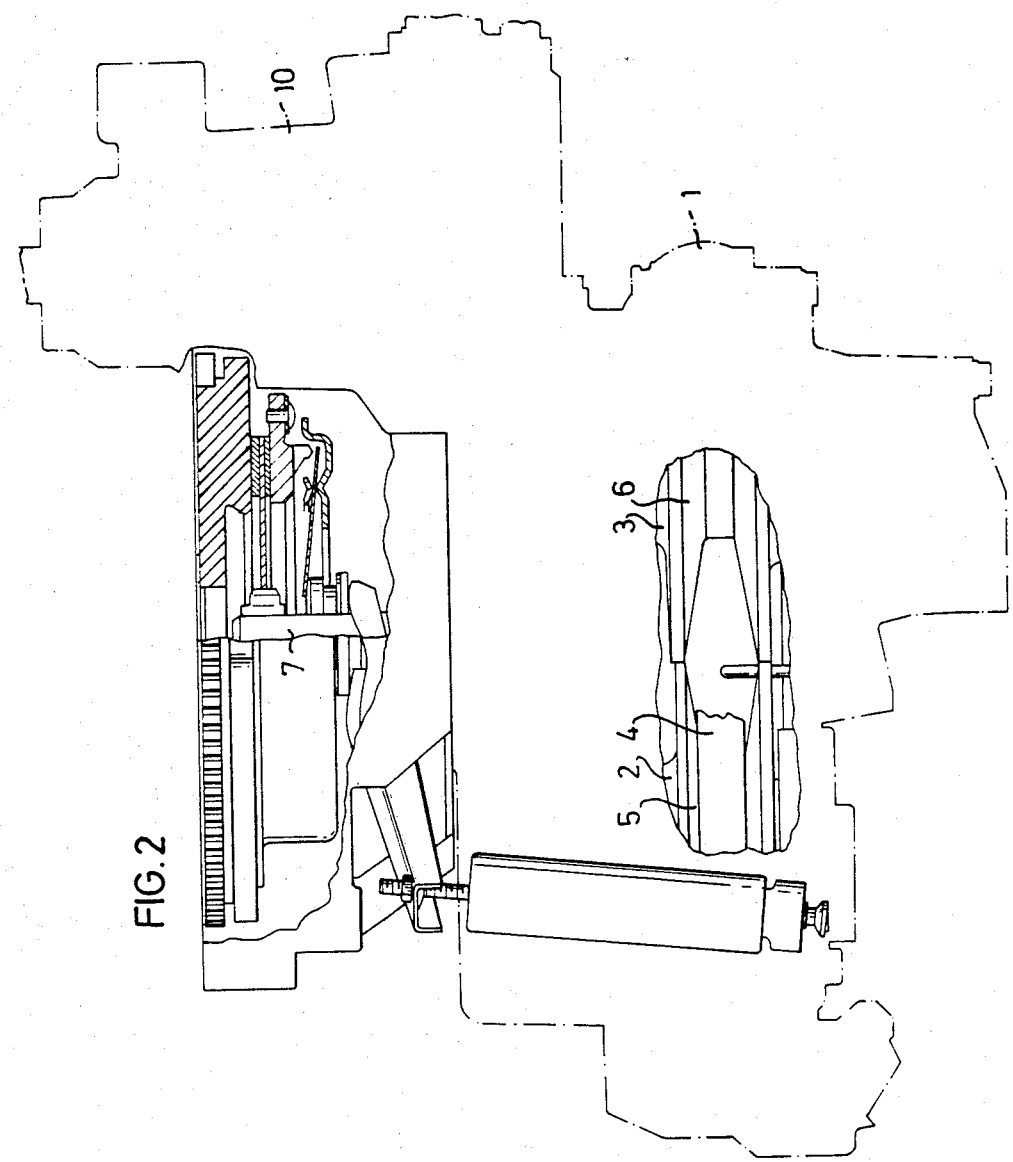

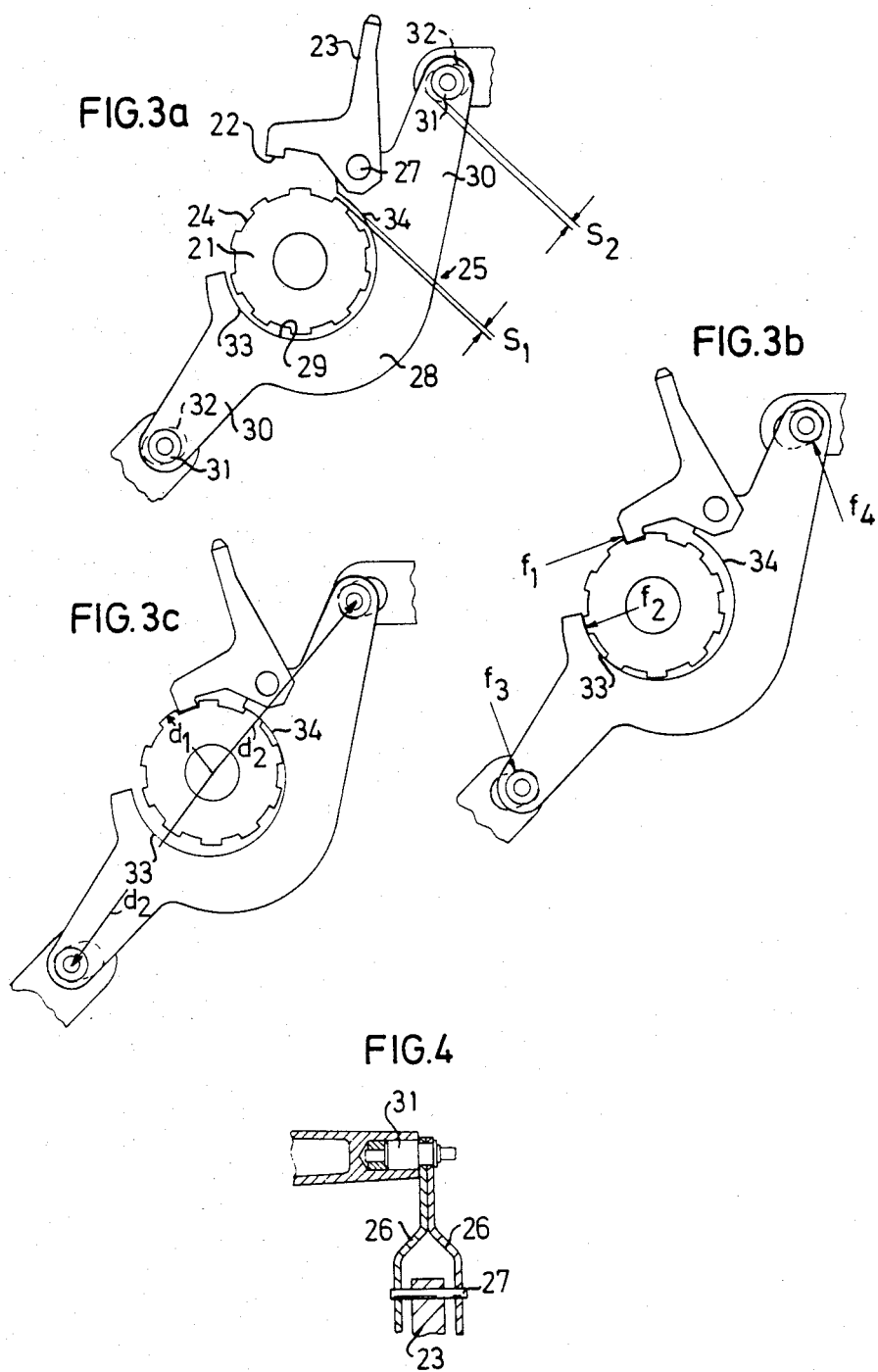

PARKING BRAKE IN A VEHICLE TRANSMISSION

The present invention relates to a parking brake in a vehicle transmission, comprising a catch element non-rotatably joined to a shaft in the transmission and having at least one radially directed cavity, and a catch body movably joined to the transmission housing, said body being movable into and out of engagement with the cavity in the catch element and, when in the engaged position, locking the shaft against rotation in the housing.

Built-in parking brakes are used in transmissions of the type in which the drive connection between the vehicle engine and the transmission is broken when the engine is not running, i.e. in automatic transmissions with torque converters and various types of automatic and semi-automatic transmissions with automatically operated clutches, i.e. centrifugal clutches. In these transmissions, the input shaft in not locked against rotation by the clutch when the engine is not running, which means that the vehicle can roll freely even with the gear engaged. To prevent this, these transmissions are equipped with a catch device which locks the output shaft to the housing and serves as a parking brake. This usually consists of a toothed wheel on the output shaft and a catch body on a pin pivotally mounted in the transmission housing, and which is connected to the gear selector.

When parking on steeply inclined surfaces, very large forces act on the toothed wheel and the catch body, which are transmitted directly to the housing via the pin of the catch body. Consequently, the housing must be dimensioned to be able to absorb these forces, which does not present any problem if the material in the housing is cast iron for example. Problems do arise however in achieving a housing which will withstand the stresses from the parking brake if the housing is to be cast in light metal alloys, e.g. aluminum or magnesium alloys. Various types of local reinforcements of the housing can of course be achieved in the form of reinforcement ribs or greater thickness of the housing walls, but this involves increased production costs and undesirable increase in weight.

The purpose of the present invention is to achieve a parking brake of the type described in the introduction by means of which the load on the housing can be reduced so that no extra reinforcements of the housing are required.

This is achieved according to this invention by movably mounting the catch body in a yoke which partially encircles the shaft in the region of the catch element and has abutment surfaces on diametrically opposite sides of the shaft, and that the yoke is mounted in the housing at a distance from said abutment surfaces, with play, to permit displacement of the yoke in a plane perpendicular to the shaft, the play between the yoke and the housing being greater than the difference between the distance between the abutment surfaces and the diameter of the circle circumscribing the catch element, so that the abutment surfaces of the yoke can be displaced into contact with the catch element.

What happens in the parking brake according to the invention when the catch body is brought into engagement with the catch element is that the yoke is displaced so that one of its abutment surfaces comes into contact with the catch element. The force acting on the catch body and the reactive force acting on the abutment surface of the yoke then form a couple which subjects the yoke to a turning moment without subjecting the shaft to bending stresses. By virtue of the fact that the mountings of the yoke in the housing are disposed at a greater distance from each other than the moment arm of said couple, which is the same as the effective radius of the catch element, the forces acting on the housing are reduced in relation to the forces acting between the catch element and the catch body. The force reduction achieved is equal to the ratio between the effective radius of the catch element and the distance between the central axis of the catch element and the respective mounting in the housing. The invention thus makes it possible with simple means to achieve a force reduction, so that the forces acting on the housing only amount to a fraction of the forces acting on the catch body and the abutment surface of the yoke.

The invention will be described in more detail below with reference to an example shown in the accompanying drawings.

FIG. 1 shows, partially in section, a front view of a transmission with a parking brake, FIG. 2 shows a simplified view from above of the transmission in FIG. 1 with the housing partially cut away, FIGS. 3a, 3b, 3c show the parking brake in FIG. 1 in the non-operational position and in operational position in different load directions, and FIG. 4 shows a section along the line IV—IV in FIG. 1.

In FIGS. 1 and 2, the numeral 1 designates the housing of a continuously variable transmission, in which torque is transmitted between a pair of shafts 2,3 with the aid of an endless V-belt or chain 4 which runs between a pair of pulleys 5,6 non-rotatably joined to the shafts 2,3. Each pulley consists of a pair of disc members with variable spacing to vary the transmission ratio with the aid of the hydraulic piston-cylinder device, not shown in more detail here, according to a known principle by changing the effective radius of the discs. The shaft 2 is driven by the transmission input shaft 7 via gears 8,9 on each shaft. The shaft 3 forms the output shaft of the transmission and drives, in a manner not shown here, a differential gear unit incorporated with the transmission, the housing of said unit being designated 10. With the aid of a shift fork 12 joined to a manually operable gear selector mechanism 11 and which displaces an engaging sleeve 13, a reverse gear pinion 14 can be engaged to transmit torque between the input shaft 7 and the shaft 2 to drive the shaft in the opposite direction. In addition to the normal positions for forward or reverse drive, the selector mechanism 11—operated by means of a Bowden cable 15—has a neutral position in which a gear 8 is released from the input shaft 7, and a parking position in which a parking catch according to the invention, which is generally designated 20, locks the output shaft 3 against rotation in the housing 1.

The parking catch 20 consists of a catch element in the form of a toothed wheel 21 non-rotatably joined to the output shaft 3, and a catch body, movably joined to the housing 1, in the form of a pawl 22 on a pivoting angled arm 23. The toothed wheel 21 has essentially rectangular tooth interspaces 24 and the pawl 22 has a shape which fits said interspaces, so that the pawl when it engages into an interspace is not subjected to a resultant force striving to move the pawl out of its engaged position.

The arm 23 is not, as can be seen from FIG. 1, articulated directly in the housing 1, but in a yoke 25 which is mounted in the housing and which partially encircles the toothed wheel 21. The yoke 25 consists of a pair of identical steel plates 26 joined to each other, between which a pin 27 extends and supports the angle arm 23 (see FIG. 4). The yoke 25 has a main portion 28 and an arcuate opening 29 in which the toothed wheel 21 lies, and attachment projections or reactive braces 30 extending in opposite directions which are joined to pins 31 which extend into oblong holes 32 in the housing 1 (see FIGS. 3a to 3c).

The yoke 25 is thus limitedly displaceable in the housing 1, the displacement distance being determined by the play $s_1$ between the periphery of the toothed wheel 21 and the edge of the opening 29. The play $s_2$ between the pins 31 and the associated holes 32 must be greater than the play $s_1$, as is most clearly illustrated in FIG. 3a, so that diametrically opposed surfaces 33, 34 on the yoke can abut against the periphery of the toothed wheel 21.

FIG. 3a shows the parking brake 20 in the non-operative position in which the angle arm 23 with the aid of the gear selector 11 is swung so that the pawl 22 is out of engagement with the toothed wheel 21. In FIGS. 3b and 3c, the pawl 22 is shown in engagement with the toothed wheel, whereby the shaft 3 is locked against rotation. In FIG. 3b it is assumed that the shaft is subjected to a torque which strives to rotate the shaft 3 clockwise. A force $f_1$ then acts on the pawl 22, which results in a displacement of the yoke so that the toothed wheel 21 comes into contact with one abutment surface 33 of the yoke 25, against which surface the reactive force $f_2$ acts. This "movable" mounting of the yoke 25 achieves firstly that the shaft 3 is not subjected to bending and secondly that the forces $f_3$ and $f_4$ transferred to the housing 1 will only be a fraction of the force $f_1$ on the pawl, since the moment arms of the forces $f_3$ and $f_4$ will be substantially longer than the moment arm of the force $f_1$. This results from the fact that the distance $d_2$ between the center of the circle circumscribing the toothed wheel 21 and each pin 27 is at least several times greater than the radius $d_1$ of that circle. In FIG. 3c, the shaft 3 is subjected to the counter-clockwise torque, which results in displacement of the yoke in the opposite direction, so that its abutment surface 34 comes into contact with the toothed wheel 21. Otherwise the situation is analogous to that shown in FIG. 3b with the only difference being that the forces act in the opposite directions.

As can be seen from the figures, the angle arm 23 is arranged so that the pawl engages the toothed wheel 21 midway between the abutment surfaces 33,34 of the yoke 25. Furthermore, it can be seen that the oblong holes 32 in the housing 1 are directed so that the yoke can be displaced at least essentially parallel to the line tangent to the toothed wheel 21 through the pivot center of the arm 23, i.e. in the direction of the force $f_1$. The arm 23 is coupled to the selector mechanism 11 via a spring 35, so that the selector can be moved to the parking position even if the toothed wheel 21 is in such a position that the pawl cannot immediately hit the center of a toothed interspace but instead hits the top of a tooth.

In the preceding there has been described a yoke, the mountings of which in the housing are placed on diametrically opposite sides of the shaft, but it is also possible, while retaining the functional principle described above, to place the mountings in other locations, e.g. on the same side of the shaft. Such a placement can be advantageous for certain applications, e.g. in order to save space.

What I claim is:

1. Parking brake in a motor vehicle transmission comprising a catch element non-rotatably joined to a rotatable shaft in the transmission and having at least one radially directed cavity, and a catch body movably joined to the transmission housing, said body being movable into and out of engagement with the cavity in the catch element and, when in the engaged position, locking the shaft against rotation in the housing, characterized in that the catch body is movably mounted in a yoke which partially encircles the shaft in the region of the catch element, said yoke having abutment surfaces on diametrically opposite sides of the shaft, and in that the yoke is mounted in the housing at a distance from said abutment surfaces, with play, to permit displacement of the yoke in a plane perpendicular to the shaft, the play between the yoke and the housing being greater than the difference between the distance between the abutment surfaces and the diameter of the circle circumscribing the catch element, so that one or the other of the abutment surfaces of the yoke can be displaced into contact with the catch element when said catch body is in engagement with said cavity, depending on the direction in which the catch element imposes force on the catch body.

2. Parking brake according to claim 1, characterized in that the distance between the center of the circle circumscribing the catch element and each yoke mounting in the housing is at least several times greater than the radius of said circle.

3. Parking brake according to claim 1, characterized in that the catch element is a toothed wheel with essentially rectangular tooth interspaces, and in that the catch body is formed of a pawl on an arm, which is pivotally journalled in the yoke on the side where one of the abutment surfaces is located, the arm being so long that the pawl engages the toothed wheel approximately midway between the abutment surfaces.

4. Parking brake according to claim 3, characterized in that the yoke is displaceable in direction which is at least essentially parallel to the tangent to the toothed wheel through the pivot center of the arm in the yoke.

5. Parking brake according to claim 3, characterized in that the toothed wheel lies in an arcuate opening in a major portion of the yoke about which the yoke partially encircles the shaft, from which there extend in opposite directions reactive braces with pins disposed in oblong holes in the housing by which pins and oblong holes the yoke is mounted in the housing with play, and in that the arm of the pawl is pivotally mounted in said major portion adjacent to one end edge of the arcuate opening.

6. Parking brake according to claim 3, characterized in that the yoke consists of a pair of spaced plates which are joined to each other, and in that the arm of the pawl is mounted on a pin running between the plates.

7. Vehicle transmission which carries pulleys on a pair of parallel shafts, between which torque is transmitted by means of a V-belt or chain, one of the shafts being driven by a rotatable input shaft of the transmission and the other forming a rotatable ouput shaft of the transmission, characterized in that the output shaft carries a toothed wheel non-rotatably joined to the shaft, in that a yoke partially encircles the toothed wheel and has abutment surfaces on diametrically opposite sides thereof, in that the yoke is mounted with play in the transmission housing, said yoke mountings being spaced away from said abutment surfaces and on opposite sides of the output shaft in such a way as to permit displacement of the yoke in a plane perpendicular to the shaft, and in that the play between the yoke and the housing is greater than the difference between the distance between the abutment surfaces and the diameter of the circle circumscribing the catch element, an arm with a pawl being pivotally mounted in the yoke on the side where one of the abutment surfaces is located, said arm being joined to manually operable means, whereby the pawl can be moved into and out of engagement with the toothed wheel, whereby when the pawl is in engagement with the toothed wheel, said play permits the yoke to move such that one or the other of said diametrically opposite abutment surfaces comes into contact with the toothed wheel depending on the direction in which the toothed wheel imposes force on the pawl.

* * * * *